United States Patent [19]
Kozyuk

[11] Patent Number: 6,035,897
[45] Date of Patent: Mar. 14, 2000

[54] METHOD AND APPARATUS FOR CONDUCTING SONOCHEMICAL REACTIONS AND PROCESSES USING HYDRODYNAMIC CAVITATION

[76] Inventor: Oleg Vyacheslavovich Kozyuk, 14600 Brookpark Rd., Cleveland, Ohio 44135

[21] Appl. No.: 09/364,737

[22] Filed: Aug. 2, 1999

Related U.S. Application Data

[63] Continuation-in-part of application No. 08/852,226, May 6, 1997, Pat. No. 5,937,906.

[51] Int. Cl.[7] ................................................ F15D 55/00
[52] U.S. Cl. ............................. 138/37; 138/40; 138/44; 366/336; 366/337; 366/338
[58] Field of Search .................... 138/37, 44, 40, 138/42; 366/336, 337, 338; 73/861.52; 208/130; 585/922, 923

[56] References Cited

U.S. PATENT DOCUMENTS

| | | | |
|---|---|---|---|
| 513,318 | 1/1894 | Grimm | 242/118.61 |
| 830,338 | 9/1906 | Ledoux | 73/861.63 |
| 1,627,161 | 5/1927 | Edwards | 48/189.4 |
| 1,892,906 | 1/1933 | Schnitter | 138/44 |

(List continued on next page.)

FOREIGN PATENT DOCUMENTS

| | | |
|---|---|---|
| 0137726 | 4/1985 | European Pat. Off. . |
| 0176763 | 4/1988 | European Pat. Off. . |
| 0083194 | 7/1988 | European Pat. Off. . |
| 322022A1 | 6/1989 | European Pat. Off. . |
| 0373620 | 6/1990 | European Pat. Off. . |
| 499110A2 | 8/1992 | European Pat. Off. . |
| 499110A3 | 8/1992 | European Pat. Off. . |
| 489211A1 | 10/1992 | European Pat. Off. . |
| 1053781 | 4/1993 | European Pat. Off. . |
| 2203870 | 5/1974 | France . |
| 1212970 | 3/1966 | Germany . |
| 1667196 | 6/1971 | Germany . |
| 2173007 | 6/1985 | Germany . |
| 2175725 | of 0000 | United Kingdom . |
| 983962 | 2/1965 | United Kingdom . |
| 1569518 | 6/1980 | United Kingdom . |
| WO8702495 | of 0000 | WIPO . |
| WO9730956 | 8/1997 | WIPO . |

OTHER PUBLICATIONS

European Search Report, Application No. EP 88 20 2837.
European Search Report, Application No. EP 92 10 1715.
Standard Search Report, File RS 94376.
Annex to the Standard Search Report No. RS 94376.
International Search Report PCT/US96/02304.
International Search Report PCT/US98/09224.

*Primary Examiner*—Patrick Brinson
*Attorney, Agent, or Firm*—Emerson & Associates; Roger D. Emerson; Timothy D. Bennett

[57] ABSTRACT

A method and apparatus for conducting sonochemical reactions and processes using in large scales liquid medium volumes is disclosed which passes a hydrodynamic liquid flow at a velocity through a flow through channel internally containing at least one element to produce a local constriction of the hydrodynamic liquid flow. The velocity of the liquid flow in the local constriction is at least 16 m/sec. A hydrodynamic cavitation cavern is created down stream of the local constriction, thereby generating cavitation bubbles. The cavitation bubbles are shifted with the liquid flow to an outlet from the flow through channel and the static pressure of the liquid flow is increased to at least 0.85 $kg/cm^2$. The cavitation bubbles are then collapsed in the elevated static pressure zone, thereby initiating the sonochemical reactions and processes. At least one element may either be a bluff body, which produces a local constriction of the hydrodynamic liquid flow, or a baffle, which contains at least one transit channel to produce the local constriction of the liquid flow.

21 Claims, 6 Drawing Sheets

U.S. PATENT DOCUMENTS

| | | | |
|---|---|---|---|
| 2,548,759 | 4/1951 | Allen | 23/288 |
| 3,049,574 | 8/1962 | Johnson | 260/666 |
| 3,081,257 | 3/1963 | Johnson et al. | 208/133 |
| 3,170,863 | 2/1965 | Spillane et al. | 208/3 |
| 3,988,329 | 10/1976 | Zucker | 260/409 |
| 4,145,520 | 3/1979 | Feltgen et al. | 528/323 |
| 4,316,673 | 2/1982 | Speer | 366/337 |
| 4,344,752 | 8/1982 | Gallagher, Jr. | 431/354 |
| 4,565,960 | 1/1986 | Takata et al. | 323/317 |
| 4,893,275 | 1/1990 | Tanaka et al. | 365/189.09 |
| 4,915,135 | 4/1990 | Kellenbarger et al. | 138/44 |
| 5,030,789 | 7/1991 | Dang Vu et al. | 585/503 |
| 5,085,058 | 2/1992 | Aaron et al. | 62/324.6 |
| 5,145,256 | 9/1992 | Wiemers et al. | 366/336 |
| 5,179,297 | 1/1993 | Hsueh et al. | 307/296.6 |
| 5,264,645 | 11/1993 | Hughes et al. | 585/640 |
| 5,300,216 | 4/1994 | Hertzberg et al. | 208/130 |
| 5,341,848 | 8/1994 | Laws | 138/44 |
| 5,413,145 | 5/1995 | Rhyne et al. | 138/44 |
| 5,492,654 | 2/1996 | Kozjuk et al. | 261/76 |
| 5,495,872 | 3/1996 | Gallagher et al. | 138/44 |

METHOD AND APPARATUS FOR CONDUCTING SONOCHEMICAL REACTIONS AND PROCESSES USING HYDRODYNAMIC CAVITATION

This application is a Continuation-in-Part of Ser. No. 08/852,226, filed on May 6, 1997 now U.S. Pat. No. 5,937,906.

BACKGROUND OF THE INVENTION

1. Field of Invention

This invention pertains to the art of methods and apparatuses for conducting sonochemical reactions and processes in aqueous and non-aqueous liquid based media, particularly for large-scale volumes, and more specifically to methods and apparatuses for utilizing hydrodynamic cavitation effects for conducting the sonochemical reactions and processes.

2. Description of the Related Art

Up to the present time, it is well known that there are many chemical reactions that essentially alter the speed and yield of finished products under the influence of ultrasonic oscillation.

There also exists a great quantity of chemical reactions that may only proceed under the influence of ultrasonic oscillation. Similar reactions may be accomplished in aqueous as well as non-aqueous, liquid-based media. The main requirement for the realization of similar reactions is the imposition of ultrasonic oscillations on the liquid medium. All of these chemical reactions relate to the class of sonochemical reactions. As determined through many years of investigation and numerous research studies (Timothy J. Mason, "Advances in Sonochemistry", Volume 3. 1993. 292 pp., JAI Press Inc.), the sources of initiation of sonochemical reactions appear as cavitation bubbles which arise in liquid-based media during diffusion within by ultrasonic oscillations.

During the collapse of the cavitation bubbles, very high localized pressures and temperatures are achieved. According to some estimations the temperature within the bubbles attains a magnitude in the order of 5000° C. and pressure of approximately 500 kg/cm$^2$ (K. S. Suslick, Science, Vol. 247, 23 March 1990, pgs. 1439–1445). These high temperatures and pressures stimulate the progress of various chemical reactions such as in the gaseous phase within the bubble as well as in the gaseous phase on the surface of the bubble.

Common for all sonochemical reactions and processes is that, for the creation of cavitation bubbles in a liquid-based medium, the principle of application of ultrasonic oscillations on the liquid-based medium is used. The basic equipment that is used in sonochemistry appears as ultrasonic devices of various designs.

This method of conducting sonochemical reactions is sufficiently effective for processing small volumes of liquids and has found its chief application on the level of laboratory research. Transitioning to large-scale volumes, however, which are used in industry, is significantly difficult and even at times impossible. This is associated with the problems that arise during the scaling up of cavitation that is produced with the aid of ultrasonic oscillations.

It is possible to avoid these shortcomings, however, by producing the quality of the initiator of sonochemical reactions, cavitation bubbles, through the course of hydrodynamics. An example of using hydrodynamic cavitation for conducting sonochemical reactions is presented in the work of: Pandit A. B., Moholkar V. S., "Harness Cavitation to Improve Processing," Chemical Engineering Progress, July 1996, pgs. 57–69.

However, the aforementioned example method of realizing sonochemical reactions with the aid of hydrodynamic cavitation is not effective. As noted by the authors themselves, one of the problems they uncovered was the ineffective utilization of the energy in the hydrodynamic flow. Utilization of non-optimal regimes of hydrodynamic cavitation leads to a decrease in the intensity of sonochemical reactions and increases the degree of heating the medium.

In the present invention, the proposed method of conducting sonochemical reactions and processes, particularly in large scale volumes of liquid-based media, allows the utilization of optimal hydrodynamic cavitation regimes and also reduces the energy consumption for conducting the processes.

The present invention contemplates a new and improved method and apparatus for conducting sonochemical reactions and processes, particularly in large scale volumes of liquid based media, using the optimal hydrodynamic cavitation regimes and reducing the energy consumption for conducting the processes, which is simple in design, effective in use, and overcomes the foregoing difficulties and others while providing better and more advantageous overall results.

SUMMARY OF THE INVENTION

In accordance with the present invention, a new and improved method and apparatus of conducting sonochemical reactions and processes is provided which may be used in large scale volumes of liquid based media, allows the utilization of optimal hydrodynamic cavitation regimes, and reduces the energy consumption for conducting sonochemical reactions and processes.

More particularly, in accordance with the present invention, the method of conducting sonochemical reactions and processes in large scale liquid media volumes includes the steps of passing a hydrodynamic liquid flow at a velocity through a flow through channel internally containing at least one element, thereby producing a local constriction of the hydrodynamic liquid flow. The method also further comprises the steps of maintaining the velocity of the hydrodynamic liquid flow when the local constriction of the hydrodynamic liquid flow adds at least 16 m/sec. (52.5 ft/sec), creating a hydrodynamic cavitation cavern downstream of the local constriction of the hydrodynamic liquid flow, thereby generating cavitation bubbles, the cavitation bubbles as shifting with the hydrodynamic liquid flow to an outlet from the flow through channel, the hydrodynamic liquid flow having a static pressure. The method further includes the steps of increasing the static pressure of the hydrodynamic liquid flow at the outlet from the flow through channel to at least 0.85 kg/cm$^2$ (12 psi) with a hydrodynamic restriction being positioned at the outlet or some distance from the flow through channel in a pipeline of the local hydraulic resistance, thereby creating elevated static pressure zone, and initiating the collapse of the cavitation bubbles in the elevated static pressure zone.

According to one aspect of the invention, the apparatus for conducting sonochemical reactions and processes in large scale liquid medium volumes includes a flow through channel for passing hydrodynamic liquid flow and internally containing at least one element providing a local constriction of the hydrodynamic liquid flow, a flow through channel having an outlet, a hydrodynamic cavitation cavern within the flow through channel and downstream of the local constriction of the hydrodynamic liquid flow for generating cavitation bubbles, a pipeline operatively connected to the outlet of the flow through channel, and a local hydraulic resistance.

According to still another aspect of the invention, the method includes passing a hydrodynamic liquid flow from an inlet chamber into an outlet chamber through a local constriction of the flow with a velocity of at least 16 m/sec (52 ft/sec), creating a filled cavitating jet containing cavitation bubbles beyond the local constriction of the flow in the outlet chamber, and initiating the collapse of the cavitation bubbles in the outlet chamber as a result of maintaining a static pressure, in the cavitating jet, at greater than 0.85 kg/cm (12 psi).

According to yet another aspect of the invention, the local constriction of the flow is in the form of at least one channel connected to the inlet chamber and the outlet chamber.

According to still another aspect of the invention, the inlet chamber and the outlet chamber are consecutively positioned along a flow stream.

According to another aspect of the invention, the inlet chamber is positioned within the outlet chamber, or the outlet chamber can be positioned within the inlet chamber.

According to another aspect of the invention, According to another aspect of the invention, the cross-section of the local constriction of the flow has a shape chosen from the group comprising circular, elliptical, right-angle, polygonal, and slot.

According to still another aspect of the invention, additional gaseous components are fed into the hydrodynamic liquid flow, the hydrodynamic liquid flow comprises hard material particles, and the hydrodynamic liquid flow repeatedly recirculates through the local constriction of the flow.

One advantage of the present invention is to introduce a method for conducting sonochemical reactions and processes using hydrodynamic cavitation, particularly in large-scale volumes of liquid-based media, which allows for the transition to the industrial scale utilization of sonochemistry.

Another advantage of the present invention is that the method of conducting sonochemical reactions and processes in large scale volumes of liquid-based media which, in accordance with the invention, is comprised of the passage of hydrodynamic liquid flow through a flow-through channel, containing not less than one section internally, having a local constriction of the liquid flow and maintaining a liquid flow velocity in this constriction of not less than 16 m/sec (52.5 ft/sec). Downstream of the local constriction, a cavitation cavity is formed which generates cavitation bubbles, moving with the liquid flow toward the flow-through channel outlet. The static pressure in the liquid flow elevates to 0.85 kg/cm² (12 psi) and greater due to the placement of the local hydrodynamic restriction at the outlet or at some distance from the outlet of the flow-through channel in the pipeline. The elevated static pressure in the flow initiates the collapsing of the cavitation bubbles. The method, in accordance with the invention, includes the placement of the local constriction of the liquid flow inside of the flow-through channel or bluff body which forms within the walls of the flow-through channel, or placement of partitions in the flow-through channel, having in its body one or several transit channels. These channels produce the local constriction of the liquid flow. Moreover, the local constrictions of the flow are produced in such a manner that the cross-sectional area of the local constriction of the flow should not be more than 0.6 the area of the cross-section of the flow-through channel.

Another advantage of the present invention is to accomplish sonochemical reactions in aqueous and non-aqueous liquid-based mediums due to the energy released during collapsing of the cavitation bubbles. The bubbles are produced by the hydrodynamic course, without the utilization of ultrasonic oscillations.

Another advantage of the present invention is that in the present method of forming collapsing cavitation bubbles fields, all the main types of sonochemical reactions are accomplished, but in significantly large volumes of liquid-based mediums.

The process proceeds in the following manner. A liquid medium flow with a velocity of 1–10 m/sec is fed into the flow-through channel. In the local constriction of the flow zone, the velocity elevates to 16 m/sec and greater. This drives the rise of hydrodynamic cavitation caverns in the flow downstream of the local constriction, filled with steam from the evaporating liquid, and also containing gases in this liquid. This makes it conducive for a low pressure steam-gas in the cavern space which constitutes, usually, a magnitude or the order of 0.01–0.2 kg/cm². The primary cavitation cavern is non-stationary, constantly pulsating with some natural frequency and ejects a great volume of cavitation bubbles into the liquid flow. The pressure of the steam-gas within the bubbles, at the moment of formation, is substantially equal to the pressure of the primary cavitation cavern. The given bubbles appear as secondary cavitation formations. The bubbles are transported in the liquid flow to the outlet out of the flow-through channel. In this part of the channel, a zone of elevated static pressure (from 0.85 kg/cm² and greater) is created by design due to the placement of a local hydraulic resistance at the outlet from the flow-through channel or immediately after the flow-through channel in the pipeline. Cavitation bubbles enter the elevated static pressure zone, which results in an instantaneous adiabatic collapsing. The collapsing duration of a bubble is approximately $10^{-6}$–$10^{-8}$ seconds and is dependent on the initial bubble dimension and static pressure of the liquid surrounding it. The velocities with which the cavitation bubbles collapse reach a magnitude in the order of 300–1000 m/sec. In the final stage of collapsing, an elevated temperature is attained inside the bubble with the velocities, $10^{10}$–$10^{11}$ K/sec. Under this steam-gas mixture, situated inside of the collapsing bubble, the cavitation bubble is heated to temperatures of approximately 3,000–15,000° C. under pressures of approximately 1,000–5,000 kg/cm². Under these physical conditions inside the cavitation bubble various chemical reactions take course between the substances found in the steam-gas state. In the final stage of bubble collapse, heating also occurs adjacent to the bubble in the liquid sphere having a layer thickness of approximately 0.1–0.4 macromolecules. The temperature to which this liquid layer is heated constitutes a magnitude in the order of 30–40 % of the temperature of the steam-gas phase inside of the bubble. The pressure at the boundary of the bubble is equal to the pressure inside the bubble. The physical parameters that are reached at the boundary of cavitation bubble with the liquid phase (pressure and temperature) are completely sufficient for the progress of pyrolysis processes in a liquid phase. Each cavitation bubble behaves as an "autonomous system."

By increasing the static pressure at the outlet from the flow-through chamber, it is possible to elevate the temperature within it at the final stage of collapsing. Another very important factor regarding the presented method is that by feeding a gaseous component into the liquid flow or into the hydrodynamic cavitation cavity space, it is possible to control the gas quantitatively and qualitatively in the cavitation bubble. That is, purposefully feeding into each bubble an identical quantity of gas or a gas mixture with pre-assigned physical properties. This allows the control of chemical reactions as well as the production of predictable product yields resulting from the reaction. It is necessary to note that feeding a pre-assigned quantity of gaseous components into the cavitation bubbles produced with the aid of ultrasonic oscillations is practically impossible. In the case of ultrasonic (acoustic) cavitation, the inflow of gaseous components into the cavitation bubbles is accomplished due to an uncontrolled straightened diffusion induced by the pulsations of the bubble in the acoustic field. That is, by using the supply of gas in the liquid flow or directly into the cavitation cavern, it is possible to have a supplementary instrument for controlling sonochemical reactions. Moreover, if the local hydraulic resistance is made to be controllable, for example, using a gate valve or cock, then it is also possible to control sonochemical reactions by altering the static pressure in the cavitation bubbles collapsing zone in a wide range. In some cases, it is possible to elevate the pressure in this zone to 30 kg/cm$^2$ and greater.

Expediently for producing a stable cavitation cavern downstream of the local flow constriction, which may exist under elevated static pressures, the local flow constriction has a cross-sectional area less than 0.6 of the cross-sectional area of the flow-through channel. Moreover, with an elevated static pressure at the outlet from the flow-through channel, the sizes of the local flow constriction cross-section area decrease.

The flow-through channel may have a circular, rectangular, square, polygonal, or any other suitable shape.

The liquid, passing through the cavitation bubbles collapsing zone is fed from the flow-through channel through the local hydraulic restriction and pipeline. Expediently, the liquid flow is subject to multiple cavitation influences, subjecting the liquid flow to recirculation through the flow-through channel. This promotes the loading of reactions of products in the liquid medium. Also the spheres of applications of sonochemical reactions may be expended by feeding into the liquid flow or directly into the cavitation cavern space several gaseous components in the form of their mixtures as well as each gaseous component separately. Such a mode also allows the control of sonochemical reactions within the bubbles. The hydrodynamic liquid flow directly may be comprised of a mixture of two or more liquid components such as one liquid soluble in one of the components as well as mutually insoluble liquids, for example, in the form of emulsions. Furthermore, in the proposed method of processing liquid media, there may also be found hard material particles, which appear as either one of the reactants, or performs the function of a catalyst. There may also be particles of several hard components present in the liquid flow. All of this allows the expansion of the sphere of practical application of sonochemistry.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings, which form a part hereof and herein.

DESCRIPTION OF THE PREFERRED EMBODIMENT

Figure 1:
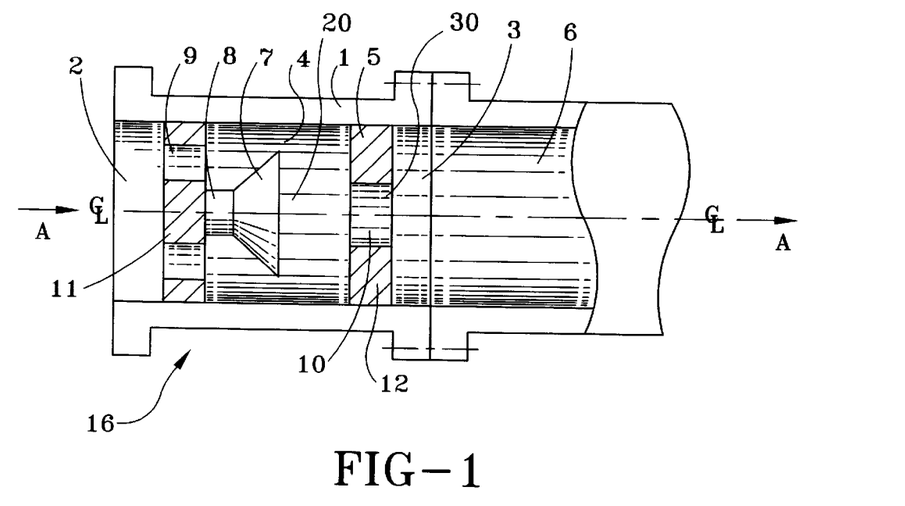
FIG. 1 is a longitudinal section of the apparatus for the implementation of a claimed method containing a bluff body and an uncontrollable local hydraulic resistance.

Referring now to the drawings wherein the showings are for purposes of illustrating a preferred embodiment of the invention only and not for purposes of limiting the same, FIG. 1 shows a longitudinal view of the apparatus 16, containing flow-through channel 1 having inlet 2, outlet 3 and local constriction 4 of the liquid flow. At the outlet 3 from the flow-through channel 1 the local hydraulic resistance 5 is positioned. Outlet 3 is connected with pipeline 6. Local constriction 4 of flow forms and is positioned inside the flow-through channel 1 along or near the centerline CL of the bluff body 7, which preferably has the shape of a cone. Bluff body 7 is positioned on stem 8, which is connected with disk 11 with orifices 9. Disk 11 with orifices 9 is mounted in the inlet 2 and retains bluff body 7 inside the flow-through channel 1. In place of disk 11 with orifices 9 it is possible to use a crosshead, post, propeller or any other fixture which produces a minor loss of pressure. The local hydraulic resistance 5 is carried out as uncontrollable in the form of a second element of local flow constriction. It has the shape of a disk 12 with orifices 10. The number of orifices 10 in disk 12 may be varied. The sizes of the orifice(s) 10 in the local hydraulic resistance 5 are selected in such a manner so that the static pressure in the liquid flow before the local hydraulic resistance 5 would reach a static pressure which is typically at least 0.85 kg/cm$^2$ (12 psi). While the sizes of the local constriction 4 of the liquid flow are set in such a manner so that the cross-section area of the local constriction 4 would be at most 0.6 of the cross section of flow-through channel 1. The hydrodynamic liquid flow, moving along the direction, noted by the arrow A through the inlet 2, flows around the bluff body 7. Under this, the liquid flow passes through the local constriction 4 of flow, where the velocity of the liquid flow increases to a minimum velocity dictated by the physical properties of the hydrodynamic liquid. On average, and for most hydrodynamic liquids, the minimum velocity is 16 m/sec (52.5 ft/sec) and greater. Beyond the bluff body 7, a hydrodynamic cavitation cavern 20 is formed, which generates cavitation bubbles. The bubbles are transported by the liquid flow to the outlet 3 from the flow-through channel 1. In this position, flow-through channel 1, an elevated static pressure zone 30 is formed from 0.85 kg/cm$^2$ (12 psi) and greater due to the placement of local hydraulic resistance 5 at outlet 3 from flow-through channel 1. Hitting the elevated static pressure zone 30, the bubbles collapse, causing high local pressures (to 5,000 kg/cm$^2$) and temperatures (to 15,000° C.). Under these physical conditions in the liquid, on the boundary of the bubble and inside the bubble itself, in the gas phase, chemical reactions proceed such as oxidation, disintegration, synthesis, etc. After passing through the collapsing bubbles zone, the liquid medium is transported out from the flow-through channel 1 through outlet channel 3 and pipeline 6. After an instantaneous cavitation effect, the liquid medium can be subjected to this influence.

Figure 2:
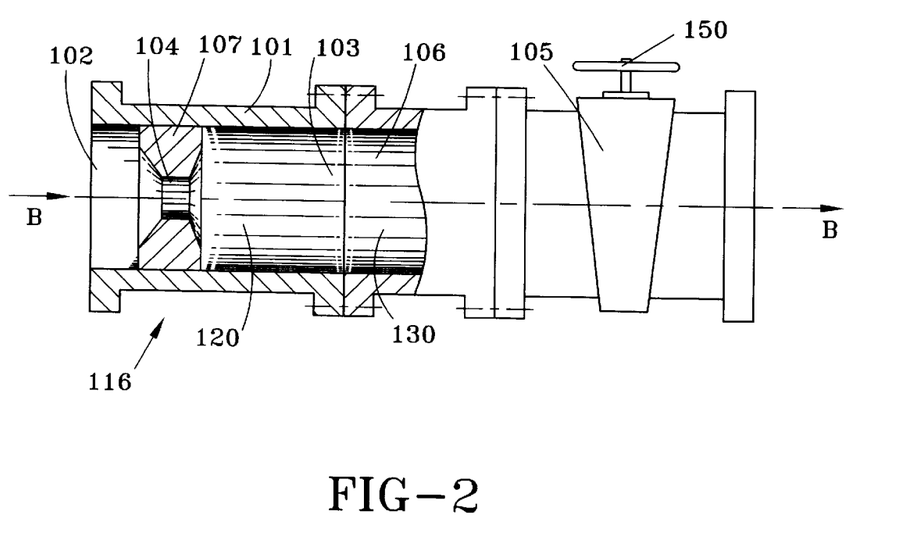
FIG. 2 is a longitudinal section of the apparatus for the implementation of a claimed method containing a baffle with a transit channel in the shape of a Venturi tube and a controllable local hydraulic resistance.
Figure 3A:
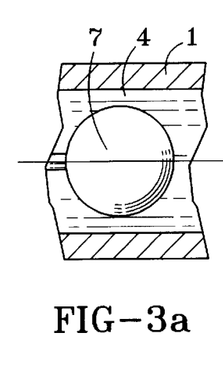
FIGS. 3A–3F are fragmented views of the longitudinal section of the local flow constriction in the apparatus according to FIG. 1 which are formed of bluff bodies of various shapes.
Figure 3B:
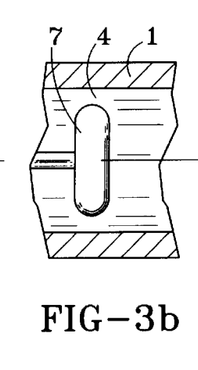
Figure 3C:
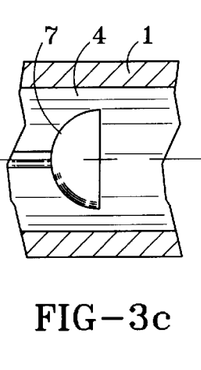
Figure 3D:
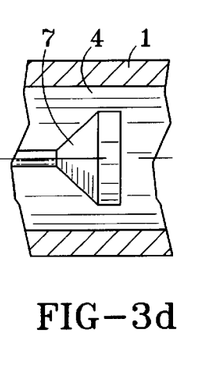
Figure 3E:
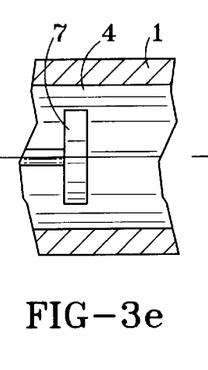
Figure 3F:
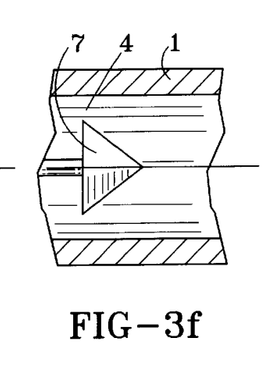
Figure 4A:
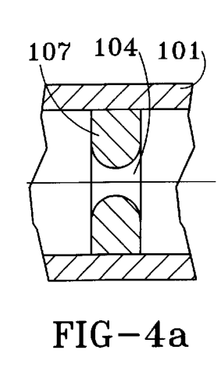
FIGS. 4A–4F are fragmented views of the longitudinal section of the local flow constriction in the apparatus according to FIG. 2 which are formed of baffles having one or several channels of various shapes.
Figure 4B:
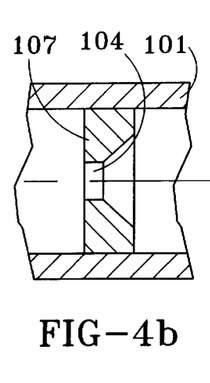
Figure 4C:
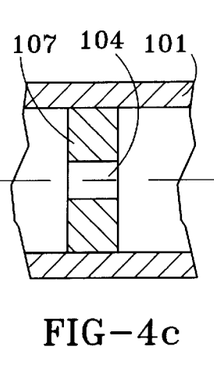
Figure 4D:
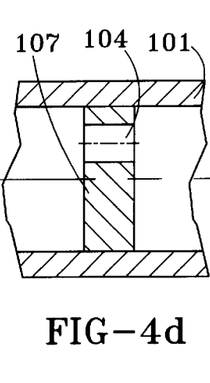
Figures 4E, 4F:
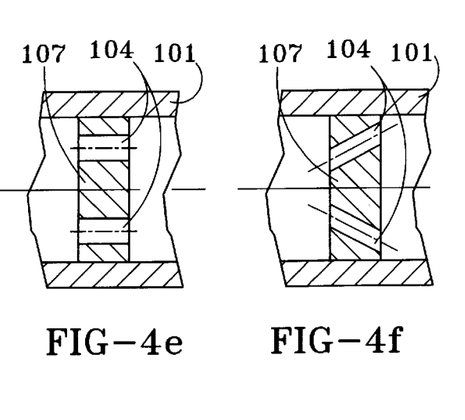

FIG. 2 presents an alternative design of the apparatus 116 intended for the accomplishment of the method.

In the apparatus 116, baffle 107 is positioned inside flow-through channel 101, after inlet 102 which has transit channel 104 in its own body. This is carried out in the shape of a Venturi tube. This transit channel 104 produces a local constriction of the liquid flow. The apparatus 116 has a local hydraulic resistance 105 that is controllable. For the performance of the controllable local hydraulic resistance 105, a valve 150 is used that is installed at some distance from outlet channel 103 and connected to it is pipeline 106.

The hydrodynamic liquid flow, moving along in the direction as noted by the arrow B, passes through the transit channel 104 at a velocity of at least 16 m/sec (52.5 ft/sec). After the baffle 107, a cavitation cavern 120 is produced, generating intermingling cavitation bubbles. Elevating the static pressure in the flow at outlet 103 from the flow-through channel 101 is accomplished with the aid of valve 150. Using the controllable local hydraulic resistance 105 allows the alteration of the magnitude of the static pressure in the collapsing cavitation bubbles zone 130 and at the same time controls the conditions for the progress of chemical reactions.

In order to control and specify the required structure of the cavitation bubbles field, bluff body 7 may have various shapes, as shown in the corresponding FIGS. 3A–3F. The transit channel 104 may have various shapes that produce the local constriction of the flow in the baffle 107, as shown in FIGS. 4A–4E. Moreover, utilizing such local constriction of flow designs (FIGS. 2, 4A–4E) are preferred during processing of smaller liquid volumes, and also for processing of liquid mediums containing sufficiently large hard material particles.

With reference to FIGS. 1 and 2, the shape of the flow-through channel 101 does not essentially exert influence on the effectiveness of the process. However, from the point of view of its manufacturability, in fabricating the device for the realization of the referenced method, it is preferred to utilize a flow-through channel 101 that has a circular, rectangular, or polygonal shape. The flow-through channel 101 may also have a cross section that has one linear section and a circular or irregularly shaped cross section, such as a semi-circle.

The liquid is fed into the apparatus 116 with the aid of a pump (not shown). The type of pump selected is determined on the basis of the physio-chemical properties of the pumpable medium and the hydrodynamic parameters necessary for the accomplishment of the process.

Several practical examples of the accomplishment of the method with the aid of the device are shown in Examples 1 and 2 described below.

EXAMPLE 1

Five (5) liters of n-Heptane, having a temperature of 76° F. in the span of 3 minutes are fed through the apparatus 116, as shown in FIG. 1. The velocity of the flow in the local constriction 4 constitutes 93.8 m/sec. The area of the local constriction of the flow cross-section 4 constitutes 0.12 from the area of the cross-sectional flow-through channel 1. The pressure at the outlet from the flow-through channel was 1.27 kg/cm$^2$.

The results of the mass spectrometry analysis of the n-Heptane samples prior to processing and after 3 minutes of processing are presented in Table 1.

TABLE 1

| Component | Initial n-Heptane Sample Wt % | After 3-min. Processing n-Heptane Sample Wt % |
|---|---|---|
| 3,3-Dimethylpentane | 0.000 | 0.003 |
| 2-Methylhexane | 0.383 | 0.384 |
| 3-Methylhexane | 1.578 | 1.577 |
| 3-Ethylpentane | 0.624 | 0.624 |
| Methylcyclohexane | 0.485 | 0.498 |
| Ethylcyclopentane | 0.078 | 0.077 |
| Toluene | 0.015 | 0.024 |
| Octane | 0.010 | 0.009 |
| Balance (n-Heptane) | 96.827 | 96.804 |

EXAMPLE 2

Two hundred (200) liters of water containing 12 ppm of phenol and having a temperature of 68° F. was fed through the apparatus 116 within a span of 10 minutes, shown in FIG. 2. The flow velocity in the transit channel 104 constitutes 16.8 rn/sec. The area of the transit channel 104 cross-section constitutes 0.62 from the area of flow-through channel 101 cross-section. The pressure at the outlet 103 from the flow-through channel 101 was 0.88 kg/cm$^2$ (12.5 psi). After processing the water under these conditions after 10 minutes, the gas chromatograph analysis showed that, as a result, the concentration of phenol was decreased to 5 ppm.

With reference to FIG. 1, the method, in accordance with the invention, is concluded in the passage of liquid-based mediums in the hydrodynamic flow through a flow-through channel 1 which internally contains at least one element, such as bluff body 7, having a local constriction 4 of the liquid flow and maintaining a liquid flow velocity in this constriction of at least 16 m/sec (52.5 ft/sec).

A cavitation cavern 20 is produced downstream of the local flow constriction 4, which generates cavitation bubbles, traversing with the liquid flow to the outlet 3 from the flow-through channel 1. The static pressure in the liquid flow increases to 0.85 kg/cm$^2$ (12 psi) and greater due to the placement of the local hydraulic 5 resistance at the outlet 3 or at some distance from the outlet 3 out of the flow-through channel 1 in the pipeline 6. Elevated static pressure in the flow initiates collapsing of cavitation bubbles. Local constriction of the flow is produced, positioned inside the flow-through channel 1 along or near its centerline CL of the bluff body 7. Also, with reference to FIG. 2, the local constriction of the flow produced, positioned with a baffle 107 inside the flow-through channel 101, has inside its body one or several transit channels 104. The transit channels 104 in the baffle 107 form local constriction of the liquid flow.

With reference to FIG. 1, local constriction of the flow 4 form in this manner so that the cross-sectional area of the local constriction 4 of the flow would be at most 0.6 of the cross-sectional area of the flow-through channel 1.

The liquid, passing through the cavitation bubbles collapsing zone is fed from the flow-through channel 1 through the local hydraulic restriction 5 and pipeline 6. Expediently, the liquid flow is subject to multiple cavitation influences, subjecting the liquid flow to recirculation through the flow-through channel 1. This promotes the loading of reactions of products in the liquid medium. Also the spheres of applications of sonochemical reactions may be expended by feeding into the liquid flow or directly into the cavitation cavern 20 space several gaseous components in the form of their mixtures as well as each gaseous component separately. Such a mode also allows the control of sonochemical reactions within the bubbles. The hydrodynamic liquid flow directly may be comprised of a mixture of two or more liquid components such as one liquid soluble in one of the components as well as mutually insoluble liquids, for example, in the form of emulsions. Furthermore, in the proposed method of processing liquid media, there may also be found hard material particles, such as particles that exhibit the characteristics of a solid or a high viscosity liquid, which appear as either one of the reactants, or performs the function of a catalyst. There may also be particles of several hard components present in the liquid flow. All of this allows the expansion of the sphere of practical application of sonochemistry.

The local hydraulic resistance 5 may be uncontrollable as is the case with straightened diffusion induced by the pulsations of a bubble in an acoustic field. However, the local hydraulic resistance 5 may also be made controllable, for example, using a valve 150, as seen in FIG. 2, to control the sonochemical reactions by altering the static pressure in the cavitation bubbles. The second local constriction of the hydrodynamic liquid flow produced by the valve 150 preferably has pre-designed geometric dimensions to meet the specifications and requirements required to carry out the sonochemical reactions.

Figure 5:
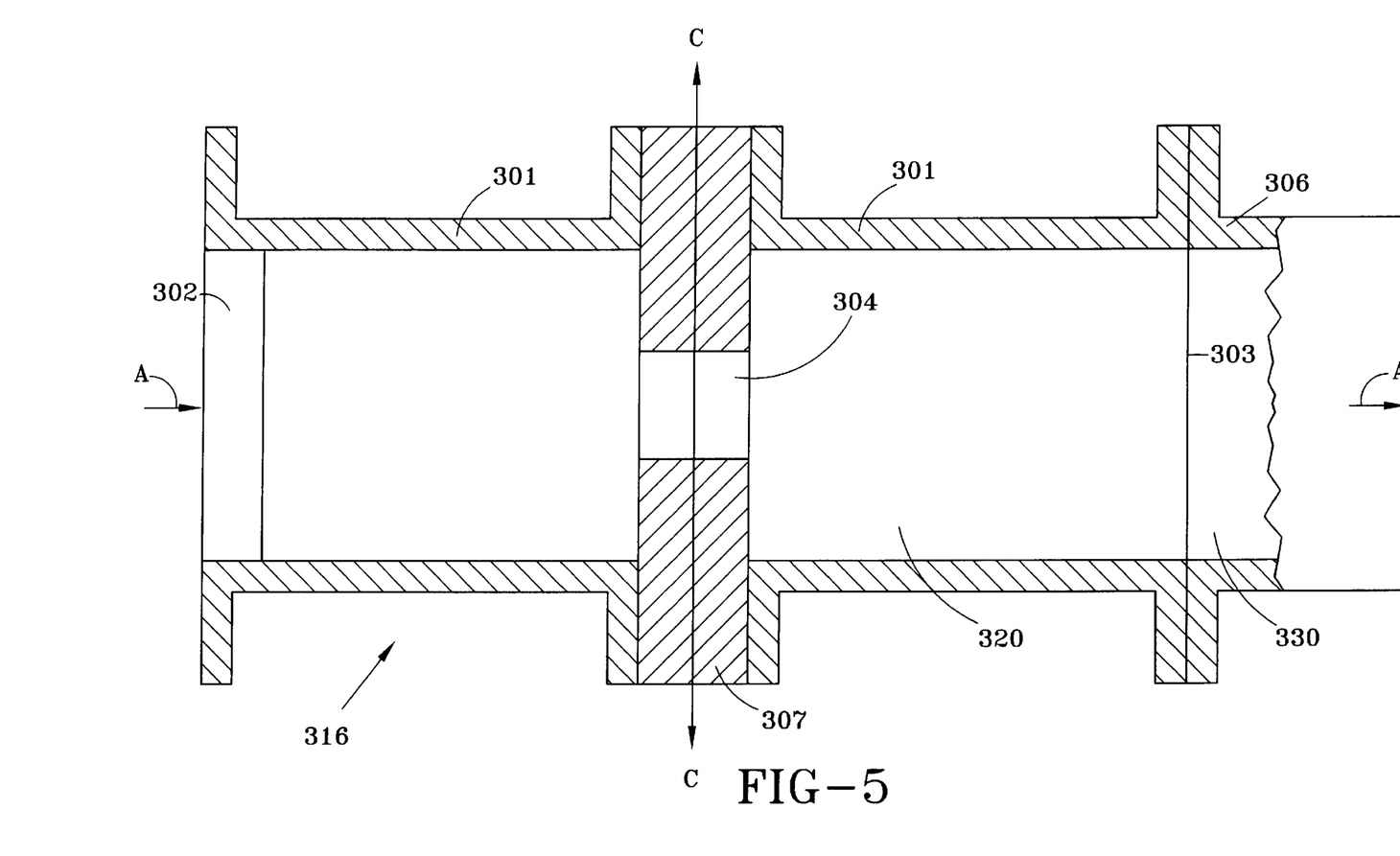
FIG. 5 is a longitudinal section of the apparatus for the implementation of a claimed method containing a baffle with a transit channel.
Figure 6:
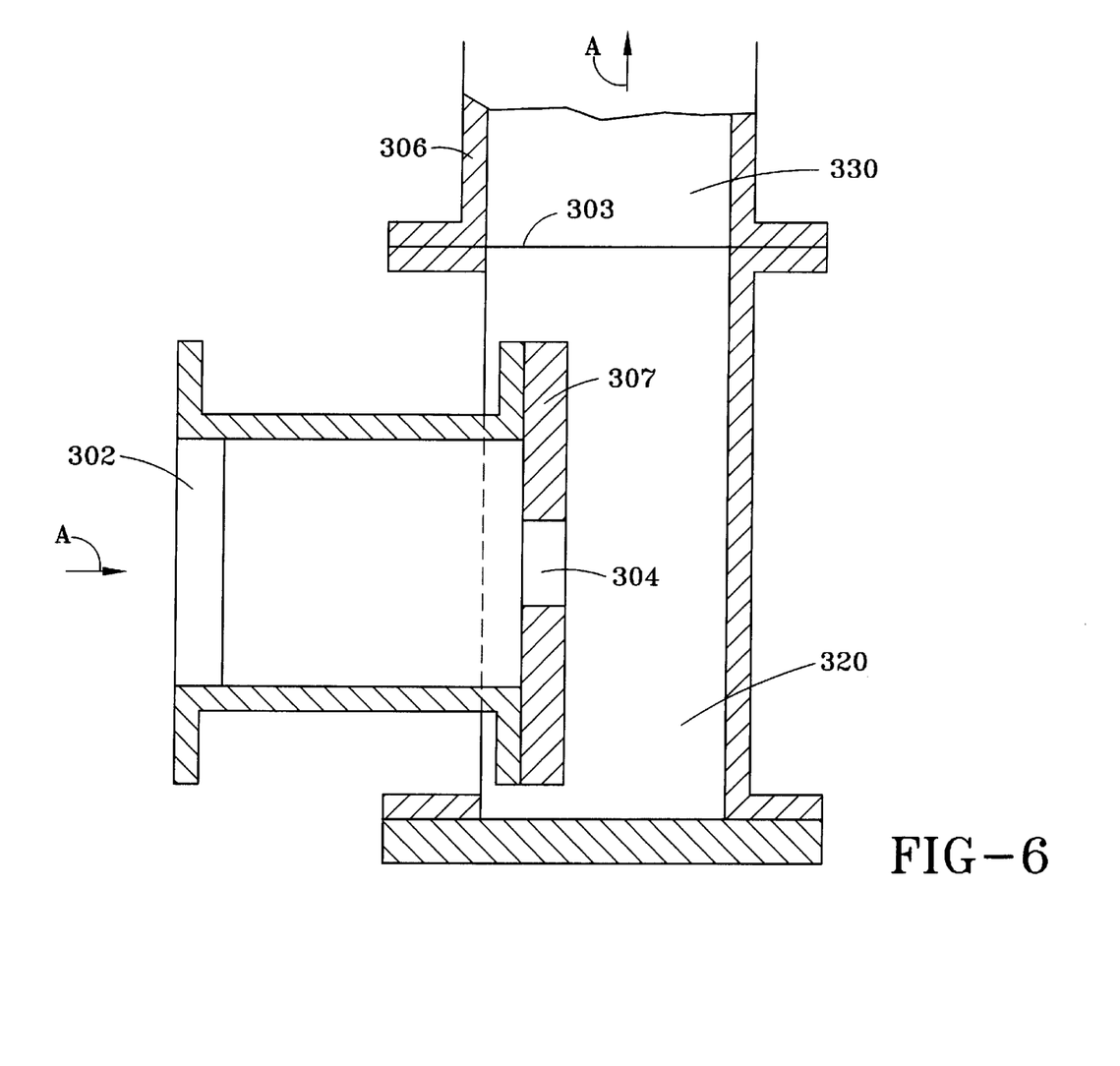
FIG. 6 is a longitudinal section of the apparatus for the implementation of a claimed method containing a baffle with a transit channel, the inlet chamber being located within the outlet chamber.
Figure 7:
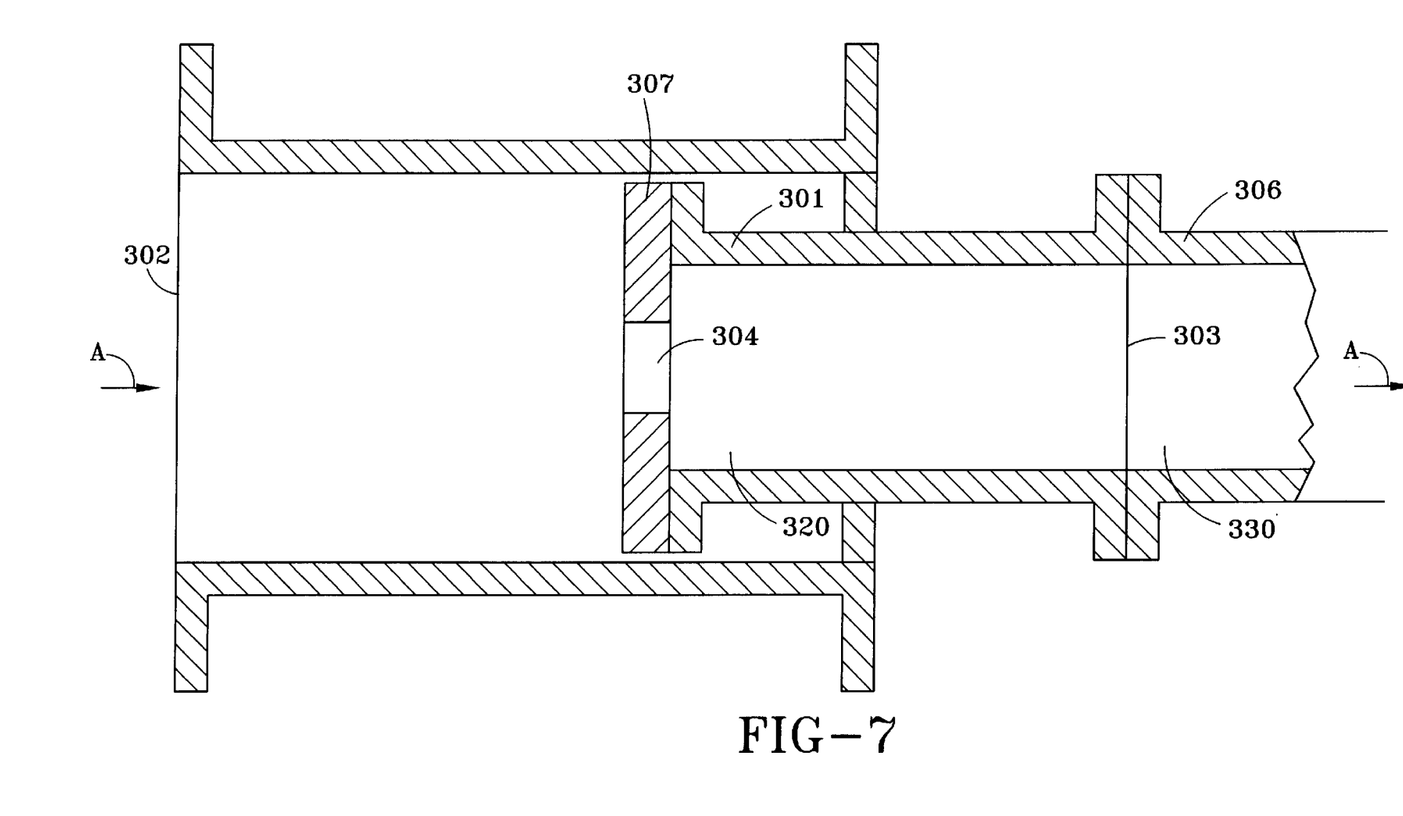
FIG. 7 is a longitudinal section of the apparatus for the implementation of a claimed method containing a baffle with a transit channel, the outlet chamber being located within the inlet chamber; and, FIGS. 8A–8E are cross-sectional views, taken along line C—C of FIG. 5, of the local flow constriction in the apparatus, which is formed by baffles having at least one channel of various shapes.
Figure 8A:
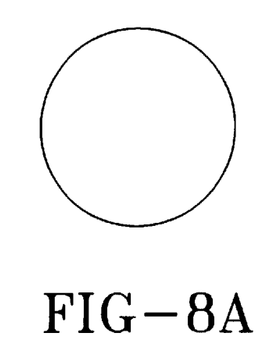
Figure 8B:
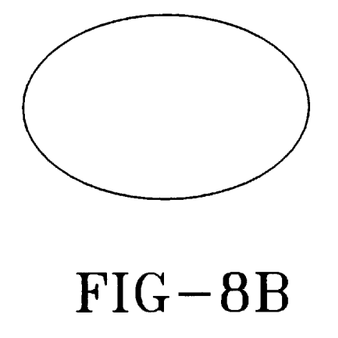
Figure 8C:
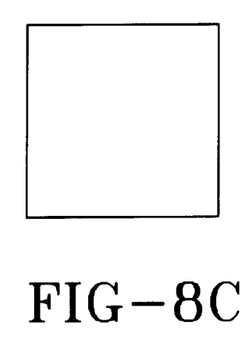
Figure 8D:
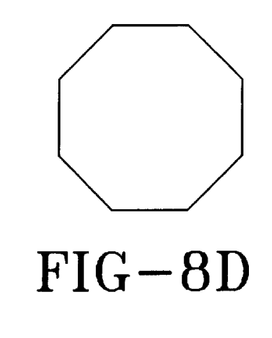
Figure 8E:
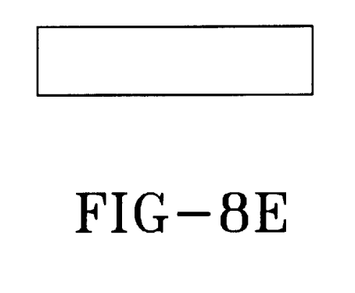

FIGS. 5–7 present alternative designs of the apparatus 316 intended for the accomplishment of the method.

In the apparatus 316, baffle 307 is positioned inside flow-through channel 301, after inlet 302 which has transit channel 304 in its own body. This transit channel 304 produces a local constriction of the liquid flow. The apparatus 316 has a local hydraulic resistance (not shown) that is controllable. For the performance of the controllable local hydraulic resistance, a valve (not shown) is used that is installed at some distance from outlet channel 303 and connected to it is pipeline 306.

The hydrodynamic liquid flow, moving along in the direction as noted by the arrow A, passes through the transit channel 304 at a velocity of at least 16 m/sec (52.5 ft/sec). After the baffle 307, a cavitation cavern 320 is produced, generating intermingling cavitation bubbles. Elevating the static pressure in the flow at outlet 303 from the flow-through channel 301 is accomplished with the aid of valve (not shown). Using the controllable local hydraulic resistance allows the alteration of the magnitude of the static pressure in the collapsing cavitation bubbles zone 330 and at the same time controls the conditions for the progress of chemical reactions.

In order to control and specify the required structure of the cavitation bubbles field, transit channel 104 may have various shapes, as shown in the corresponding FIGS. 8A–8E. Moreover, utilizing such local constriction of flow designs is preferred during processing of smaller liquid volumes, and also for processing of liquid mediums containing sufficiently large hard material particles.

With reference to FIGS. 5–7, the shape of the flow-through channel 301 does not essentially exert influence on the effectiveness of the process. However, from the point of view of its manufacturability, in fabricating the device for the realization of the referenced method, it is preferred to utilize a flow-through channel 301 that has a circular, rectangular, or polygonal shape. The flow-through channel 301 may also have a cross section that has one linear section and a circular or irregularly shaped cross section, such as a semi-circle.

The liquid is fed into the apparatus 316 with the aid of a pump (not shown). The type of pump selected is determined on the basis of the physio-chemical properties of the pumpable medium and the hydrodynamic parameters necessary for the accomplishment of the process.

FIGS. 5–7 show three different embodiments of the apparatus 316. FIG. 5 shows the inlet chamber (shown, but not referenced) and the outlet chamber (shown, but not referenced) consecutively positioned along the flow stream. FIG. 6 shows the inlet chamber positioned within the outlet chamber, and FIG. 7 shows the outlet chamber positioned within the inlet chamber.

The preferred embodiments have been described herein. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of conducting sonochemical reactions and processes in large scale liquid medium volumes comprising the steps of:

passing a hydrodynamic liquid flow from an inlet chamber into an outlet chamber through a local constriction of the flow with a velocity of at least 16 m/sec (52 ft/sec);

creating a filled cavitating jet containing cavitation bubbles beyond the local constriction of the flow in the outlet chamber; and,     initiating the collapse of the cavitation bubbles in the outlet chamber as a result of maintaining a static pressure, in the cavitating jet, at greater than 0.85 kg/cm (12 psi).

2. The method of claim 1, wherein the method further comprises the step of:

providing the local constriction of the flow in the form of at least one channel connected to the inlet chamber and the outlet chamber.

3. The method of claim 1, wherein the method further comprises the step of:

providing the inlet chamber and the outlet chamber consecutively positioned along a flow stream.

4. The method of claim 1, wherein the method further comprises the step of:

providing the inlet chamber positioned within the outlet chamber.

5. The method of claim 1, wherein the method further comprises the step of:

providing the outlet chamber positioned within the inlet chamber.

6. The method of claim 2, wherein the method further comprises the step of:
providing the at least one channel forming the local constriction of the flow with a cross-section, the cross-section having a shape chosen from the group comprising:
circular, elliptical, right-angle, polygonal, and slot.

7. The method of claim 3, wherein the method further comprises the step of:
providing the at least one channel forming the local constriction of the flow with a cross-section, the cross-section having a shape chosen from the group comprising:
circular, elliptical, right-angle, polygonal, and slot.

8. The method of claim 4, wherein the method further comprises the step of:
providing the at least one channel forming the local constriction of the flow with a cross-section, the cross-section having a shape chosen from the group comprising:
circular, elliptical, right-angle, polygonal, and slot.

9. The method of claim 5, wherein the method further comprises the step of:
providing the at least one channel forming the local constriction of the flow with a cross-section, the cross-section having a shape chosen from the group comprising:
circular, elliptical, right-angle, polygonal, and slot.

10. The method of claim 1, wherein the method further comprises the step of:
feeding additional gaseous components into the hydrodynamic liquid flow.

11. The method of claim 1, wherein the method further comprises the step of:
providing the hydrodynamic liquid flow comprising hard material particles.

12. The method of claim 1, wherein the method further comprises the step of:
recirculating the hydrodynamic liquid flow, repeatedly, through the local constriction of the flow.

13. The method of claim 2, wherein the method further comprises the step of:
recirculating the hydrodynamic liquid flow, repeatedly, through the local constriction of the flow.

14. The method of claim 3, wherein the method further comprises the step of:
recirculating the hydrodynamic liquid flow, repeatedly, through the local constriction of the flow.

15. The method of claim 4, wherein the method further comprises the step of:
recirculating the hydrodynamic liquid flow, repeatedly, through the local constriction of the flow.

16. The method of claim 5, wherein the method further comprises the step of:
recirculating the hydrodynamic liquid flow, repeatedly, through the local constriction of the flow.

17. The method of claim 6, wherein the method further comprises the step of:
recirculating the hydrodynamic liquid flow, repeatedly, through the local constriction of the flow.

18. The method of claim 7, wherein the method further comprises the step of:
recirculating the hydrodynamic liquid flow, repeatedly, through the local constriction of the flow.

19. The method of claim 8, wherein the method further comprises the step of:
recirculating the hydrodynamic liquid flow, repeatedly, through the local constriction of the flow.

20. The method of claim 9, wherein the method further comprises the step of:
recirculating the hydrodynamic liquid flow, repeatedly, through the local constriction of the flow.

21. The method of claim 10, wherein the method further comprises the step of:
recirculating the hydrodynamic liquid flow, repeatedly, through the local constriction of the flow.

* * * * *